United States Patent [19]

Nagasaka

[11] Patent Number: 4,737,017
[45] Date of Patent: Apr. 12, 1988

[54] OPTICAL ELEMENT HOLDING MECHANISM AND METHOD OF MANUFACTURING THE SAME

[75] Inventor: Ken Nagasaka, Sakai, Japan

[73] Assignee: Minolta Camera, Osaka, Japan

[21] Appl. No.: 664,119

[22] Filed: Oct. 23, 1984

[30] Foreign Application Priority Data

Oct. 25, 1983 [JP] Japan ............................ 58-200465
Sep. 4, 1984 [JP] Japan .......................... 59-134762[U]

[51] Int. Cl.$^4$ .............................................. G02B 7/02
[52] U.S. Cl. ................................... 350/245; 350/252
[58] Field of Search ............. 350/245, 251, 252, 589, 350/590, 103; 156/73.5, 73.6

[56] References Cited

U.S. PATENT DOCUMENTS

| | | | |
|---|---|---|---|
| 2,703,773 | 3/1955 | Stimson | 350/590 |
| 3,399,477 | 9/1968 | Johnson, Jr. et al. | 350/103 |
| 3,970,033 | 7/1976 | Lindner et al. | 350/103 |
| 3,981,759 | 9/1976 | Summo | 156/73.5 |
| 4,055,761 | 10/1977 | Shimomura | 350/589 |
| 4,303,306 | 12/1981 | Ookawa | 350/252 |
| 4,305,988 | 12/1981 | Köcher | 156/73.5 |

FOREIGN PATENT DOCUMENTS 4482536 1/1974 Japan .
49-38482 9/1974 Japan .

*Primary Examiner*—John K. Corbin
*Assistant Examiner*—Loha Ben

[57] ABSTRACT

A holding mechanism for holding an optical element comprises a holding frame and a retaining member. The holding frame includes first and second positioning portions. The optical element is positioned in one direction along parallel to the optical axis by the first positioning portion and is positioned in a direction perpendicular to the optical axis by the second positioning portion. After inserting the optical element and the retaining member into the holding frame, supersonic vibration is applied to generate heat and produce a high temperature at a contact portion of the holding frame and the retaining member, so that the contact portion welds due to the high temperature for establishing another positioning portion positioning the optical element in an opposite direction along to the optical axis. The retaining member is molded from a thermoplastic resin, and the holding frame can be made of a metal material as well as of a thermoplastic resin.

8 Claims, 7 Drawing Sheets

FIG.1
PRIOR ART
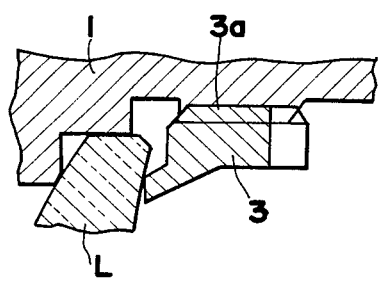
FIG.2
PRIOR ART
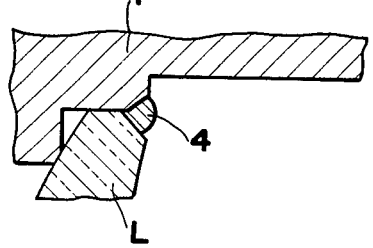
FIG.3
PRIOR ART
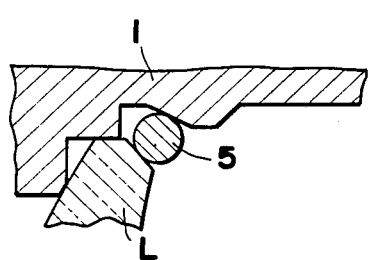
FIG.4a
PRIOR ART
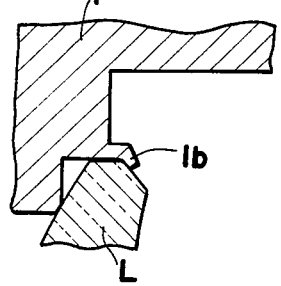
FIG.4b
PRIOR ART
FIG.4c
PRIOR ART
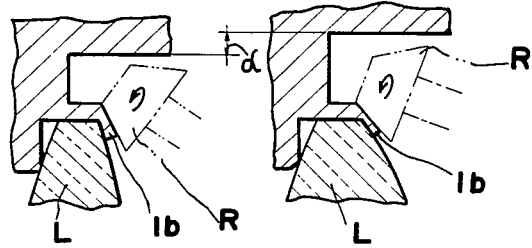

OPTICAL ELEMENT HOLDING MECHANISM AND METHOD OF MANUFACTURING THE SAME

BACKGROUND OF THE INVENTION

1. Field of the Invention

The present invention relates to an improved device or mechanism for holding an optical element such as a lens, reflection mirror or prism in a lens barrel, frame or the like, as well as a method for manufacturing such a device or mechanism.

2. Description of the Prior Art

Heretofore, there have been various arrangements for holding an optical element such as a lens or a reflection mirror. Several examples thereof are shown in FIG. 1 through FIG. 4 of the drawings in each of which a lens L is held by a lens barrel 1 made of a synthetic resin or metal material.

FIG. 1 shows an arrangement in which a washer 3 has a male thread 3a formed on its outer circumference. A female thread meshing with the male thread 3a is formed on the lens barrel 1 to have the washer 3 retain and hold a lens L against the lens barrel 1. In this arrangement, since the thread has to be formed on the inner circumference of the lens barrel 1, if the lens barrel is made of a synthetic resin, the shape of the die for molding the lens barrel 1 is complicated, thereby increasing the cost of the device. Although the thread may be formed by machining after the molding of the lens barrel 1, this also increases the manufacturing cost, as well as resulting in the disadvantage that chips are liable to be produced upon screwing the threaded washer 3 into the lens barrel 1. Further, since the lens L is retained by the force of screwing the threaded washer 3, if a large force is used for ensuring a tight mounting, distortions may result particularly in the case of a thin lens. While on the other hand, if the screwing force is decreased, looseness may possibly result to render the holding effect unstable. In the case where the lens barrel 1 is made of metal, it also requires the step of forming the thread on the lens barrel 1 by machining, resulting in an increased cost as well.

FIG. 2 shows an arrangement in which a lens L is fixed by adhesives 4. In this case, although the lens distortions are less, since a limit is imposed on the bonding strength of the adhesives 4, it is not suitable for the holding of a heavy lens. Next, since it takes much time for the hardening of the adhesives 4, the assembling procedure is time-consuming. Further, the surface of the lens L tends to be clouded by gases such as any solvent generated from the adhesive 4. In addition, since it is difficult to uniformly coat the adhesive, the appearance is liable to be worsened.

FIG. 3 shows an arrangement using a spring washer 5 having a radial resiliency. A gap narrowing radially outwardly is formed between a lens barrel 1 and a lens L. The spring washer 5 is fitted tightly into the gap and urged by its resiliency against both the lens barrel 1 and the lens L to thereby hold the lens L. In this case, however, since the spring washer 5 intensely pressures both the lens barrel 1 and the lens L, distortions may be caused in both of the members. If the lens barrel 1 is distorted, focusing or similar operations cannot be conducted smoothly. Further, since the spring washer 5 is fitted into the gap in the condition of being resiliently deformed it may abut against and injure the lens L.

FIG. 4 shows an arrangement of fixing a lens L by heat caulking, in which a lens barrel 1 is formed with a flange 1b, which is heated and then deformed by a roller or spatula to thereby hold the lens L. In this case, since clearance for a roller R is necessary at a position in the lens barrel 1 outwardly from the outer circumference of the lens L as shown in FIG. 4 (b), the radial size of the lens barrel 1 must be increased as compared with the diameter of the lens. Particularly, in a case where the radius of curvature at the surface of the lens L is small or the lens L is located deeply within the lens barrel 1 as shown in FIG. 4(c), a large clearance, nearly the the diameter of the roller R, is necessary since the axis of the roller has to be placed almost in parallel with the optical axis, which neccessitates that the size of the lens barrel 1 be larger. Furthermore, since the flange 1b is successively pressed by the roller, even a slight error in the positioning of the roller will render the flange enforcing force non-uniform and cause distortions in the lens L.

As described above, conventional mechanisms and methods for holding a lens or other optical element employed so far have merits and demerits respectively, and no suitable arrangement has yet been attained.

SUMMARY OF THE INVENTION

The object of the this invention is to provide an improved device or mechanism capable for firmly mounting or holding optical elements with no distortion in the optical element, and which requires no additional space which unnecessarily enlarges the overall device.

Another object is to provide a method of manufacturing such a holding mechanism or device.

In order to attain the foregoing objects, the mechanism according to this invention for holding an optical element such as a lens, refection mirror or prism comprises a holding frame and a retaining member. The holding frame is molded from a thermoplastic resin material and comprises a first positioning portion for positioning an optical element along a first direction parallel to the optical axis, a second positioning portion for positioning the optical element along a direction perpendicular to the optical axis and a welding projection disposed so that it does not hinder the movement of the optical element in the direction of the optical axis before welding. The retaining member is molded from a thermoplastic resin and is provided with a welding end portion. The optical element is inserted into the holding frame until the element is positioned by the first and the second positioning portions. The retaining member is also inserted into the holding frame, and the welding end portion brought into contact with the welding projection. The welding end portion and the welding projection are melted by frictional heat or by the heat of supersonic vibrations and deformed to enclose the end portion of the optical element. The deformed portion described above functions as a third positioning portion positioning the optical element in a second direction parallel to the optical axis and opposite to the first direction.

Another feature of this invention resides in the provision of a retaining member that is molded of a thermoplastic resin and a metal holding frame. The holding frame comprises a first positioning portion for positioning an optical element along a first direction parallel to the optical axis, a second positioning portion for positioning the optical element along a direction perpendicular to the optical axis and an engaging dent or recess formed adjacent to the second positioning portion. The retaining member is provided with a welding end portion. The optical element is inserted into the holding frame until the element is positioned by the first and second positioning portions. The retaining member is also inserted into the holding frame to a position where the welding end portion comes in contact with the holding frame or the optical element. The welding end portion is melted by frictional heat or by the heat of supersonic vibrations and deformed to enclose the end portion of the optical element and to engage the engaging dent. The deformed portion described above is formed into a third positioning portion positioning the optical element along a second direction parallel to the optical axis and opposite to the first direction. Accordingly, since the optical element is not held by intense pressure, no distortion occurs in the optical element. Further, since the optical element is supported by the thermally deformed welding end portion of the retaining member, it is highly impact resistant and can be firmly held.

Furthermore, since the retaining member is moved only in the direction of the optical axis, no large space is necessary in the direction transverse to the optical axis thereby obviating any increase in the size of the structure.

The above and other objects, features and advantages of the preent invention will become more apparent from the following description when taken in conjuction with the accompanying drawings in which preferred embodiments of the present invention are shown by way of illustrative example.

BRIEF DESCRIPTION OF THE DRAWINGS

FIG. 1 is a fragmentary cross sectional view of the first conventional embodiment of an optical element holding mechanism;

FIG. 2 is a fragmentary cross sectional view of the second conventional embodiment;

FIG 3 is a fragmentary cross sectional view of the third conventional embodiment;

FIGS. 4a, 4b and 4c are fragmentary cross sectional views of the fourth conventional embodiment;

DESCRIPTION OF THE PREFERRED EMBODIMENT

This invention will now be described by way of preferred embodiments while referring to the accompanying drawings.

Figure 5:
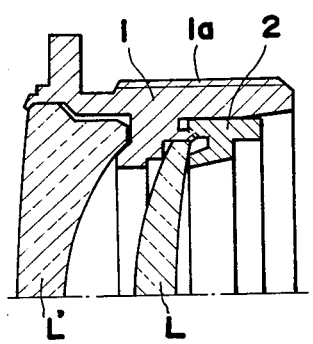
FIG. 5 is a fragmentary cross sectional view of a first embodiment according to this invention.
Figure 6:
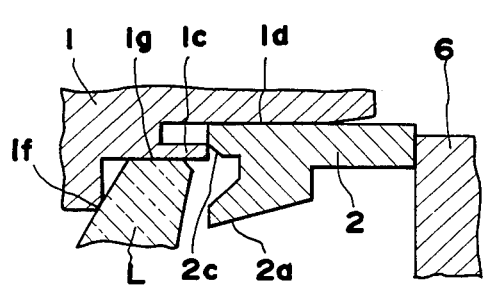
FIG. 6 is an enlarged fragmentary cross sectional view of the embodiment of FIG. 5 before assembling.
Figure 7A:
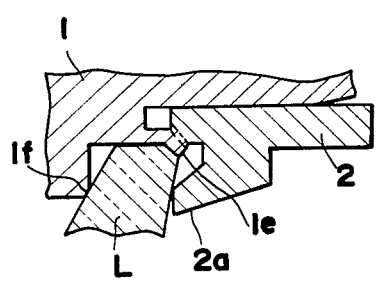
FIG. 7a is a view similar to FIG. 6 showing the device in assembled condition and FIG. 7b is an enlarged detailed view thereof.
Figure 7B:
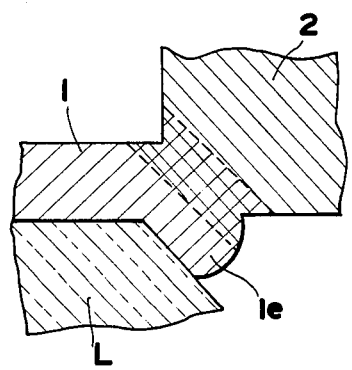

FIG. 5 through FIG. 7 show the first embodiment according to this invention. The invention is applied in this embodiment to a lens barrel for holding a lens. A generally annular lens holding frame 1 is molded from a thermoplastic resin and it has helicoid threads at its outer circumferential surface for retracting or extending through screwing into and out of another barrel member not illustrated. A lens L is held by the holding frame 1 and a retainer ring 2. L' denotes a lens fixed by conventional heat caulking.

FIG. 6 shows the state before the welding in an enlarged scale On the inner circumferential surface of the holding frame 1, are formed a first circumferential positioning portion 1f with a diameter smaller than that of the outer diameter of the lens L, a second positioning portion 1g formed by way of a stepped portion and having a diameter corresponding to the outer diameter of the lens L and a retainer ring engaging bore face or fit 1d having a diameter larger than the outer diameter of the lens L. A circumferential welding flange 1c extends from the second positioning portion 1g to the inner side of the retainer ring fit 1d.

A generally annular retainer ring 2 also made of a thermoplastic synthetic resin has an outer diameter just fitting the retainer ring fit 1d. The retainer ring 2 is chamfered at its forward inner cicummferential corner into a tapered portion 2c. Further, an abutment 2a extends circumferentially from the inner circumferential surface to the forward end of the retainer ring 2 and is formed with the tapered portion 2c, and the extended end forms circumferential abutment 2a.

In the drawing, reference numberal 6 denotes a horn of a supersonic welder.

Unpon assembling, the lens L is fitted to the second positioning portion 1g within the holding frame 1 and positioned in its forward position by the first positioning portion 1f in the holding frame 1 as shown in FIG. 6. Then, the retainer ring 2 is inserted with the tapered portion 2c and the abutment 2a into the retainer ring bore or fit 1d of the holding frame 1, the tapered portion 2c abutting the top end of the welding flange 1c. Then the horn 6 is abutted against the other end of the retainer ring 2 to apply supersonic vibrations.

The supersonic vibrations emitted from the horn 6 to the retainer ring 2 are propagated through the retainer ring 2 and concentrated at the contact portion or interface of a small area between the tapered portion 2c and the welding flange 1c. This heats the interface to a high temperature to weld the welding flange 1c. Then, as the horn 6 is moved toward the lens L, depending on the amount of welding molten matter of the welding flange 1c flows in the inner radial direction of the lens L while beeing guided by the configuration of the tapered portion 2c to enclose or embrace the end of the lens L. The movement of the retainer ring 2 is inhibited when the abutment 2a formed at the inner surface of the retainer ring 2 abuts the surface of the lens L to provide the state shown in FIG. 7.

During this assembling work, the tapered portion 2c of the retainer ring 2 is also fused or welded by the supersonic vibrations and, at the completion of the assembling work showin in FIG. 7(a), a weld portion 1e resulting through the melting of the welding flange 1c and the tapered portion 2c are mutually fused or welded. Accordingly, upon coagulation of the melted matter the holding frame 1 and the retainer ring 2 are integrated to support the lens L.

In the welding procedure described above, since the horn 6 has only to be moved depending on the amount of the welding flange 1c melted and no strong force is required for advancing the horn, no intense pressure is applied to the lens L and less distortions result in the lens L.

Figure 8:
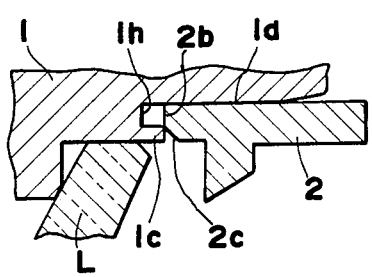
FIG. 8 is a fragmentary cross sectional view of a second embodiment according to this invention before assembling.
Figure 9:
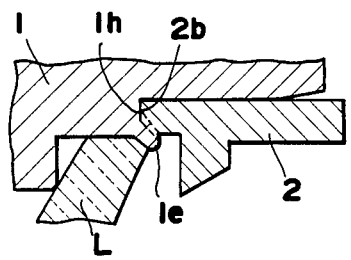
FIG. 9 is a view similar to FIG. 8 but shown in assembled condition.

FIGS. 8 and 9 show the second embodiment according to this invention, which is particularly suitable to the case of an easily deformable thin or plastic lens. In this embodiment, the retainer ring 2 has no abutment 2a, and the end face 2b on the side formed with the tapered portion 2c serves as an abutting face for limiting the advance of the retainer ring 2. The holding frame 1 is also formed with an abutting face 1h for abutment with the end face 2b. The abutting face 1h is formed as a surface perpendicular to the optical axis of the lens L extending from the base portion of the welding flange 1c to the retainer ring fit surface 1d, that is, at a position radially outwardly from te welding flange 1c. After fitting or inserting the lens L into the holding frame 1 in the same manner as in the first embodiment, the retainer ring 2 is inserted or fitted into the retainer ring fit 1d as shown in FIG. 8, and the horn of a supersonic vibrator is applied against it. A high temperature heat is generated at the contact portion between the tapered portion 2c and welding flange 1c by the supersonic vibrations to melt the contact portion. As the horn is moved toward the lens L depending on the welded amount, melted matter of the welding flange 1c flows so as to enclose the end of the lens L also in the same manner as in the first embodiment. When the retainer ring 2 continues to move, the end face 2b abuts the abutting face 1h of the holding frame 1 to prevent in further movement. Then, when the molten portion cools and coagulates, the lens L is held by both the holding frame 1 and the retainer ring 2 as shown in FIG. 9. The welded portion 1e resulting through heat deformation of the welding flange 1c and the tapered portion 2c are melted or fused and intermixed in the same manner as in the first embodiment.

In the embodiment, since the retainer ring 2 is not in direct contact with the surface of the lens L but the melted and deformed matter matter merely encloses the end of the lens, distortions in the lens can further be decreased.

Figure 10:
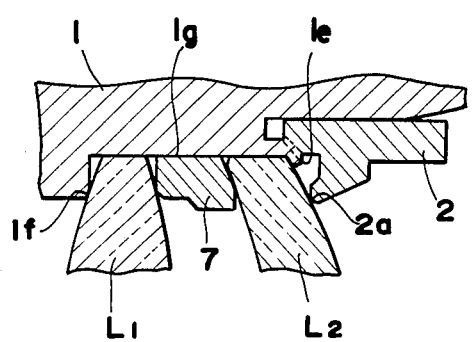
FIG. 10 is a cross sectional view of a third embodiment according to this invention.

FIG. 10 shows the third embodiment, which is the same as the first embodiment except that two lens elemnts are secured at once. That is, a second positioning portion 1g in the holding frame 1 is provided for an increased length in the combined lenses parallel with the optical axis and, after fitting a first lens element L1 till it abuts against the first positioning portion 1f and fitting an annular spacer 7 having an outer diameter equal to that of the lens till it abuts against the first lens element L1, a second lens element L2 is inserted. Then, a retainer ring 2 is fitted and welded by the supersonic vibrations in the same manner as in the first embodiment.

Figure 11:
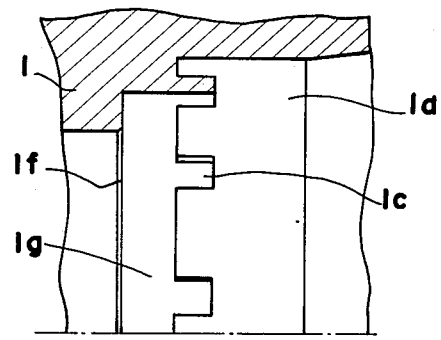
FIG. 11 is a fragmentary cross sectional view of a fourth embodiment according to this invention.

FIG. 11 shows an embodiment, in which a welding flange 1c of a holding frame 1 is formed with a plurality of peripherally spaced tongues instead of the continuous ring-shaped configuration as in the first and second embodiments. In this case, different from the foregoing embodiments, the lens is held not by entire enclosure but by the partial enclosure of the outer circumference thereof. Accordingly, the area of contact between the lens and the weld portion can be decreased to reduce the assembling pressure thereby further decreasing the distortions imparted to the lens. The shape of the tongues of the tongue-like welding flange 1c can be of various configurations such as of triagonal shape in addition to the rectangular form illustrated in the drawing.

Figure 12:
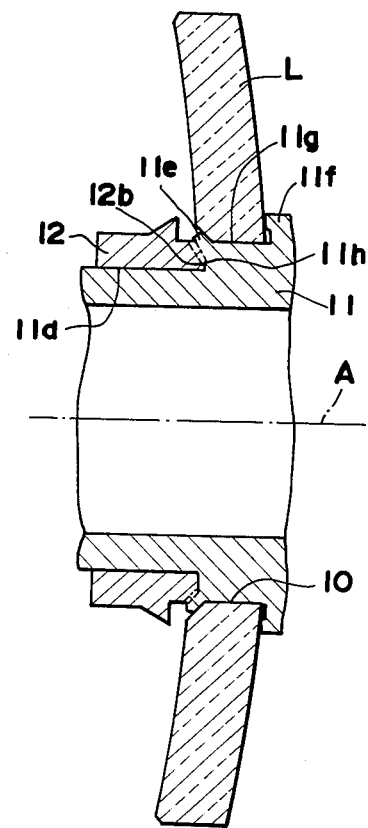
FIG. 12 is a fragmentary cross sectional view of a fifth embodiment according to this invention.

FIG. 12 shows a still further embodiment according to this invention applied to a catadioptic lens for a camera system or a reflecting telescope. In the present embodiment, only the state where the welding is completed is illustrated. A reflection mirror L has circular aperture at the center and plating is applied to the left concave surface to form a relection face. Light from an object enters by way of a lens (not illustrated) disposed at the left, reflected at the concave surface to the left, reflected by a second reflection mirror (not illustrated) disposed at the left in the drawing, again to the right and then advances further passing through the circular aperture at the center of the reflection mirror L.

The reflection mirror L is fixed near the circular hole to the lens barrel. The members for fixing the reflection mirror L are so formed that the inner circumferential surface and the outer circumferential surface are reversed relative to each other as compared with the holding frame and the retaining ring in the earlier described embodiments.

In the state where the welding is not completed (not illustrated), a holding tube 11 comprises a first positioning portion 11f having a diameter larger than that of the inner circumference 10 of the circular hole, a second positioning portion 11g extending therefrom and having an outer diameter approximately the diameter of the inner circumference 10 of the mirror circular hole, a welding flange projecting from the second positioning portion 11g and extending parallel with the optical axis A of the reflection mirror and a retainer ring fit 11d joined to the base of the welding flange by way of an abutting face perpendicular to the optical axis A and having a diameter smaller than that of the inner circumference 10 of the mirror circular hole.

A retainer ring 12 is chamfered at the outer circumferential corner on one end thereof into a tapered portion.

The above-described construction of the present embodiment is the same as that for the second embodiment shown in FIGS. 8 and 9 except that the relationship between the inner circumferential and outer circumferential portions are relatively reversed, and the assembling work is carried out in the same manner as in the second embodiment.

In the foregoing embodiments, the welding flange and the tapered portion are melted, mixed and fused to each other, and the materials for the holding frame and the retainer ring can be selected in any desired combination provided that they cause no difficulty in mixing them with each other.

Both the holding frame and the retainer ring are made of synthetic thermoplastic resin in each of the above-described embodiments but it is also possible to form only the retainer ring of a synthetic thermoplastic resin and form the holding frame of metal.

Explanation will now be made for other embodiments in whic the holding frame is made of metal.

Figure 13:
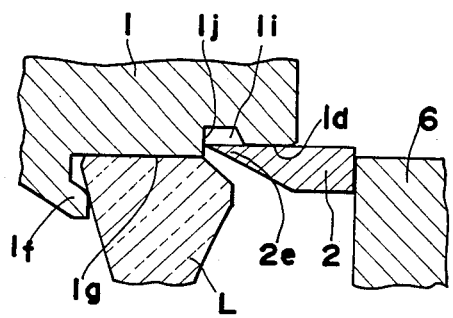
FIG. 13 is a fragmentary vertical cross sectional view of a sixth embodiment according to this invention illustrated before the welding of the retainer member.
Figure 14:
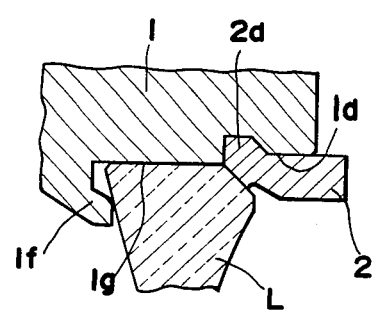
FIG. 14 is a view similar to FIG. 13 but shown after welding.
Figure 15:
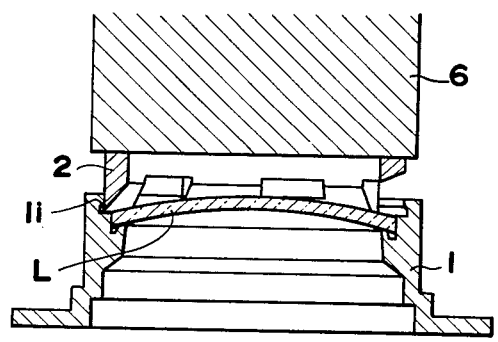
FIG. 15 is a vertical cross sectional view showing the state of a seventh embodiment according to this invention before supersonic welding.
Figure 16:
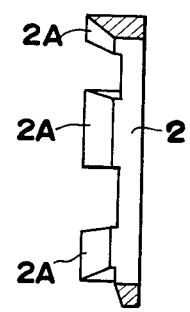
FIG. 16 is a vertical cross sectional view of the retainer member used in the embodiment shown in FIG. 15.
Figure 17:
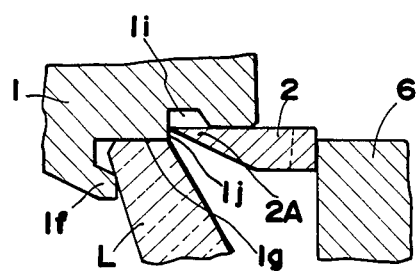
FIG. 17 is an enlarged fragmentary cross sectional view thereof before welding.
Figure 18:
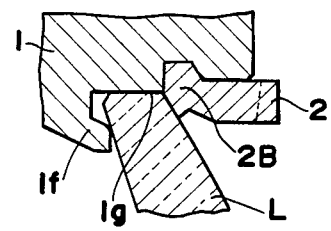
FIG. 18 is a view similar to FIG. 17 but after welding.

FIGS. 13 and 14 show the sixth embodiment according to this invention.

A metal holding frame 1 of annular shape comprises at the inner circumferential surface thereof an annular first positioning member 1f abutting the surface of a lens L at a position inwardly of the outer edge of the lens L, an annular second positioning portion 1g engaging the outer circumferential surface of the lens L and a retainer ring fit 1d having a diameter larger than the outer diameter of the lens L. A weld reservoir 1i for engaging with an annular ridge or enlarged head 2d of the retainer ring 2 is formed between the second positioning portion 1g and the retainer ring fit 1d. The first positioning portion 1f limits the forward axial movement of the lens L and the second positioning portion 1g serves to position the lens L in the direction perpendicular to the optical axis, which are the same as those in the first through fifth embodiments. The axial movement of the lens L in the other direction is inhibited by the annular coupling head 2d of the retainer ring 2 that engages the weld reservoir 1i. Specifically, since the holding frame is made of metal in this embodiment, it does not melt, mix and fuse with the retainer ring. Therefore, the securing or coupling between the retainer ring and the holding frame is made by the engagement between the weld reservoir 1i and the annular head 2d.

The retainer ring 2 is an annular member made of a synthetic theroplastic resin different from the holding frame 1 and it has an outer diameter approximately that of the the retainer ring fit 1d. The retainer ring 2 terminates at its rear top end 2e in a tip of triangular cross section that abuts the side wall 1j of the second positioning portion 1g as shown in FIG. 13. Reference numeral 6 denotes a horn of a supersonic welder abutting the other end of the retainer ring 2.

Upon fixing the lens L, the lens L is positioned at the second positioning portion 1g in the holding frame 1, by fitting it to a position where the surface of the lens abuts the first positioning portion 1f as shown in FIG. 13. Then, the retainer ring 2 is fitted into the retainer ring fit 1d of the holding frame 1 to abut the top end 2e against the side wall 1j of the second positioning portion 1g. In this state, the holding frame 1 is rotated by 90 degrees so that the retainer ring 2 comes to the upper side and mounted with a supersonic welder (not illustrated). Then, the horn 6 is applied to the upper end of the retainer ring 2 and the supersonic welder is actuated for a predetermined welding time.

Then, supersonic vibrations are propagated from the horn 6 to the retainer ring 2 to generate high temperature heat at the boundary between the holding frame 1 made of metal and the retainer ring 2 made of synthetic resin, so that the top end 2e of the retainer 2 made of synthetic resin is melted instantaneously and flows toward the weld reservoir 1j of the holding frame 1. Then, as the horn 6 is moved toward the lens 6 depending on the melted amount of the retainer ring 2, molten matter from the top end 2e fills the weld reservoir 1i and is welded to the tapered portion of the lens that slants from the outer to the inner circumferential surface. The welds are cooled upon stopping of the supersonic vibrations to form an annular engagement 2d that inhibits the lens L from axial movement in the other or rearward direction as shown in FIG. 14.

Also in the case of securing the lens L through welding in this way, since the horn 6 has only to be moved depending on the welded amount of the top end 2e of the retaining ring 2 and no great force is required for pressing the lens L or the retainer ring 2, no distortion will be imparted to the lens L if it is thin. Further, since the depth of the lateral size of the weld reservoir 1i is as small as about 0.2–0.3 mm, a narrow radial space in the holding frame 1 can effectively be utilized for the firm fixing of the lens L.

FIGS. 15 through 18 show the seventh embodiment according to this invention. In this embodiment, the front top end 2A of a retainer ring 2 is not of continuous annular shape but is formed with a given number of equally peripherally spaced recesses in the reversed manner as that in the foregoing fourth embodiment (refer to FIG. 11). This embodiment is also suitable to an easily deformable thin or plastic made lens.

In this case, a lens L and the retainer ring 2 are fitted into the holding frame 1 in the same manner as in each of the foregoing embodiments, the supersonic welder is positioned with the lens L held horizontally, a horn 6 is applied to the upper end face of the retainer ring 2 and the energy of the supersonic vibrations is concentrated through the horn 6 to each of the terminal ends 2A of the retainer ring 2 for a predetermined length of time to form engagements 2B for engaging with the weld reservoir 1i to fix the lens L through welding.

In the present embodiment, since the area of contact between the lens L and the engagement 2B of the retainer ring 2 can be reduced in the same manner as the fourth embodiment, the applied force upon supersonic welding can be decreased to further reduce the distortions imparted to the lens L.

Figure 19:
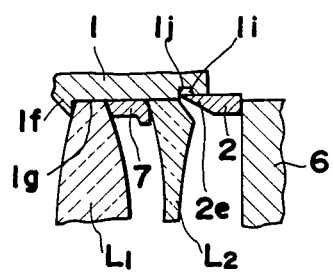
FIG. 19 is a vertical fragmentary cross sectional view of an eighth embodiment according to this invention before welding.
Figure 20:
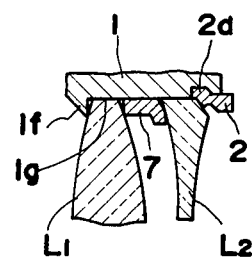
FIG. 20 is a view similar to FIG. 19 but after welding.

FIGS. 19 and 20 show the eighth embodiment according to this invention, in which two lens elements L are fixed in a holding frame 1 in the same manner as in the third embodiment (refer to FIG. 10). A second positioning portion 1g of the holding frame 1 is formed for a greater length along the optical axis to perform the positioning of the first lens element L1 and second lens element L2 in the direction perpendicular to the optical axis. And the axial positioning for the first lens element L1 in the forward direction is performed by the first positioning portion 1f, and the axial positioning of the second lens element L2 is performed by the first positioning portion 1f, the first lens L1 and a spacer 7.

The number of spacers 7 may be increased to two or more so that three or more lenses may be mounted to the holding frame 1.

Figure 21:
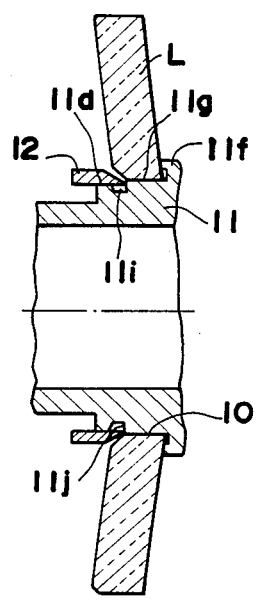
FIG. 21 is a vertical cross sectional view of a ninth embodiment according to this invention before welding.
Figure 22:
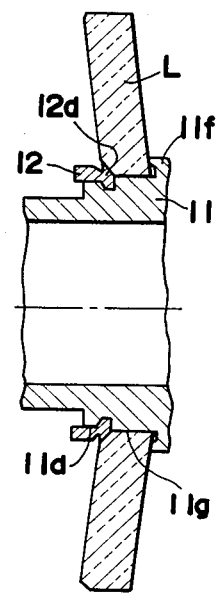
FIG. 22 is a view similar to FIG. 21 but after welding.

FIGS. 21 and 22 show the ninth embodiment according to this invention, in which a reflection mirror L for use in a catadioptric lens for a camera system or a reflecting telescope is fixed to a holding frame 11. This embodiment has a structure similar to that in the foregoing sixth embodiment (refer to FIG. 13 and FIG. 14) except that the relationship between the inner circumferential and outer circumferential portions is reversed.

Figure 23:
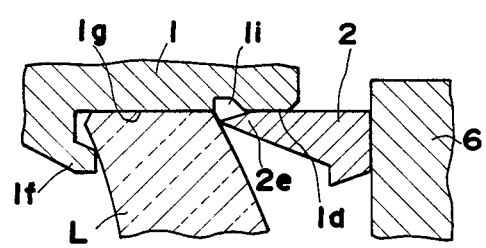
FIG. 23 is a vertical cross sectional view of a tenth embodiment according to this invention before welding.
Figure 24:
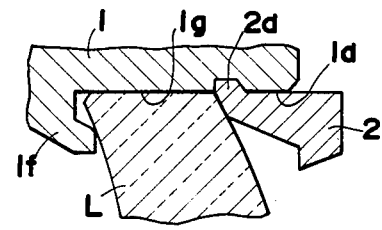
FIG. 24 is a view similar to FIG. 23 but after welding.

FIGS. 23 and 24 show the tenth embodiment according to this invention, which is somewhat modified from the sixth embodiment (refer to FIGS. 13 and 14). The inner diameter of a retainer ring fit 1d which was larger than the outer diameter for the lens L in the sixth embodiment is now made equal to the outer diameter of lens L, a front top end 2e of a retainer ring 2 is abutted against the surface of the lens L and an annular mating ridge or engagement 2d of the retainer ring 2 is formed to engage a weld reservoir 1i in a holding frame 1 by a supersonic welder.

Figure 25:
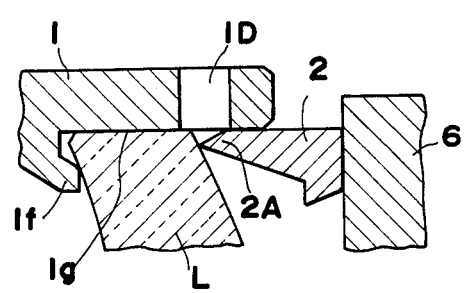
FIG. 25 is a vertical cross sectional view of an eleventh embodiment according to this invention before welding.
Figure 26:
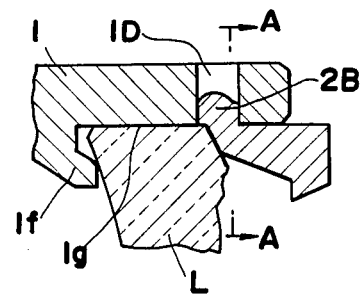
FIG. 26 is a view similar to FIG. 25 but after welding.
Figure 27:
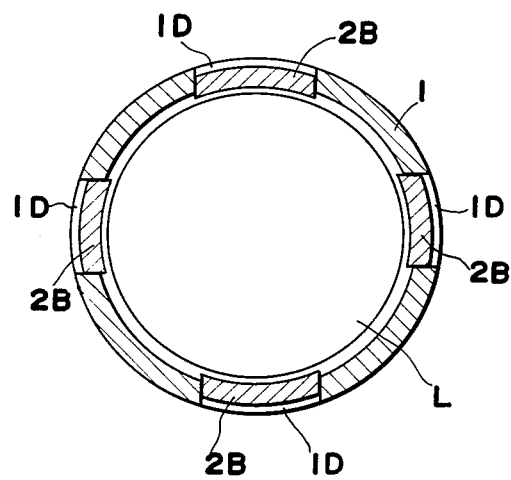
FIG. 27 is a cross sectional view taken along line A—A in FIG. 26.

In the structure of the present embodiment, since the inner diameter of the retainer ring fit 1d is made equal to the outer diameter of the lens L, the size of the holding frame 1 can be made smaller to further reduce the overall size FIGS. 25 through 27 show the eleventh embodiment according to this invention, in which a weld reservoir 1i formed continuously in the circumferential direction at the inner surface of a holding frame 1 in the tenth embodiment is divided into a plurality of circumferentially spaced long holes 1D (refer to FIG. 27). The top end 2A of a retainer ring 2 is notched to form or delineate protrusions corresponding to the long holes 1D, and a lens L is fixed to the holding frame 1 by melting the protrusions abutting the surface of the lens L by the supersonic vibrations of a horn 6 and forming radial projections 2B engaging the long holes 1D.

In this embodiment, since the area of contact between the lens L and the projctions 2B of the retainer ring 2 is further reduced as compared with the case of the tenth embodiment, the distortions resulting in the lens L can further be decreased while attaining the same effect as that in the tenth embodiment.

Figure 28:
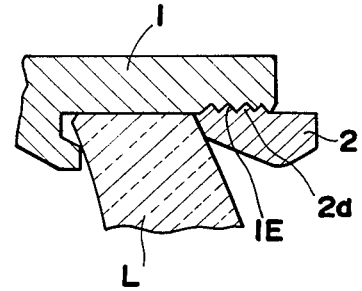
FIG. 28 is a cross sectional view of a part of the twelfth embodiment according to this invention.

FIG. 28 shows the twelfth embodiment according to this invention, in which a weld reservoir comprises a plurality of fine notched grooves 1E formed circumferentially along the inner surface of a holding frame 1 and a lens L is fixed to a holding frame 1 by welding an annular engagement 2d of a retainer ring 2 to the notched grooves 1E.

Also in this embodiment, the same effect as described with respect to the tenth embodiment can be obtained

What is claimed is:

1. A mechanism for holding an optical element, comprising:
  a holding frame molded from a thermoplastic resin material and including a first positioning portion positioning the optical element in a first direction along the optical axis of the optical element and a second positioning portion positioning the optical element in a direction perpendicular to the optical axis; and
  a retaining member molded from a thermoplastic resin material and fitted in the holding frame at a position opposite to the first positioning portion along the optical axis;
  wherein the holding frame further includes a third positioning portion arranged between the retaining member and the optical element positioned by the first and second positioning portions and stuck to the retaining member for positioning the optical element in a second direction opposite to the first direction.

2. A mechanism as recited in claim 1, wherein said retaining member further includes a fourth positioning portion axially positioning the retaining member relative to optical element along the optical axis.

3. A mechanism as recited in claim 1, wherein the holding frame and the retaining member include mutually contacting for relatively positioning the holding frame and the retaining member along the optical axis.

4. A mechanism as recited in claim 1, wherein said third positioning portion includes a plurality of projecting portions circumferentially spaced about the optical axis.

5. A method of manufacturing a holding mechanism for holding an optical element, comprising:
  molding a holding frame from a thermoplastic resin material, the holding frame including a first positioning portion positioning the optical element in a first direction along the optical axis of the optical element, a second positioning portion positioning the optical element in a direction perpendicular to the optical axis and a welding projection formed on the inner circumference of the holding frame;
  molding a retaining member from a thermoplastic resin material, the retaining member including a welding end portion for engaging the welding projection;
  inserting the optical element into the holding frame until the optical element is positioned by the first and second positioning portions;
  inserting the retaining member into the holding frame in the same direction as the optical element to bring the welding end portion into contact with the welding projection with the retaining member spaced from the optical element;
  applying a supersonic vibration to the retaining member to generate, at a contact portion where the welding end portion and the welding projection contact one another, heat which causes the temperature of the contact portion to rise to the fusion value of the thermoplastic resin materials;
  moving the retaining member toward the optical element depending on the amount of fusion to deform the welding projection with intermixing with the welding end portion and thereby to enclose a peripheral end portion of the optical element in a second direction opposite to the first direction; and
  hardening the contact portion for causing the welding projection intermixed width the welding end portion to serve as a third positioning portion positioning the optical element in the second direction.

6. A method of manufacturing a holding mechanism for holding an optical element as recited in claim 5, where said supersonic vibration is applied with a supersonic horn abutting the retaining member, and the supersonic horn is moved toward the optical element depending on the amount of fusion with the moving of the retaining member.

7. A method of manufacturing a holding mechanism for holding an optical element as recited in claim 5, wherein said welding end portion is formed as a peaked end portion to narrow the area of the contact portion.

8. A method of manufacturing a holding mechanism for holding an optical element as recited in claim 5, wherein said retaining member includes a fourth positioning portion positioning the retaining member with the optical element along the optical axis by engaging the optical element in said moving step of the retaining member.

* * * * *